United States Patent Office 3,396,267
Patented Aug. 6, 1968

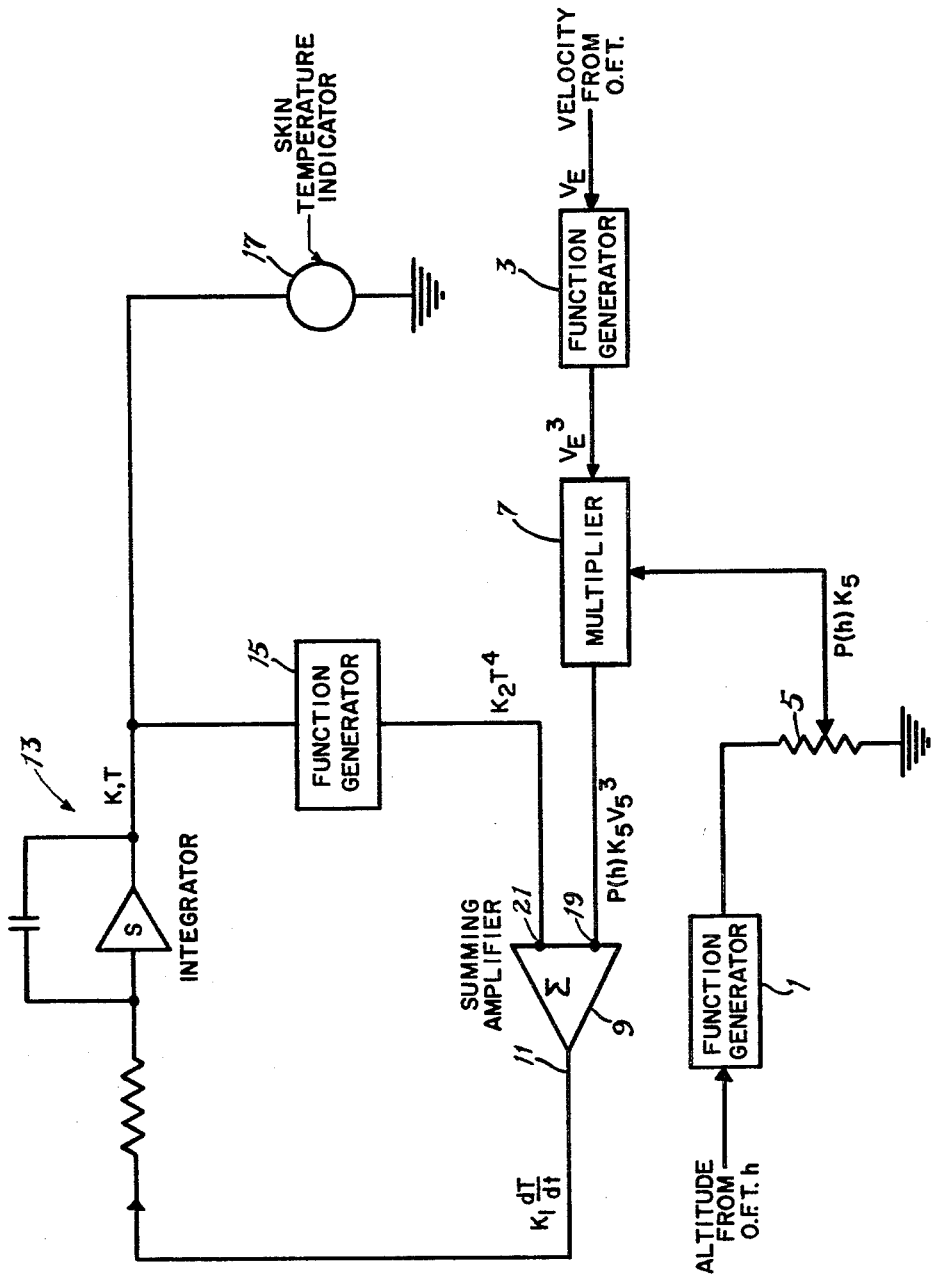

3,396,267
HEAT SIMULATOR COMPUTER
Arnold K. Dietrich, Binghamton, N.Y., assignor, by mesne assignments, to the United States of America as represented by the Secretary of the Navy
Filed Apr. 22, 1965, Ser. No. 450,224
1 Claim. (Cl. 235—193)

ABSTRACT OF THE DISCLOSURE

A computer for providing, in a space capsule simulator, an indication of capsule skin temperature resulting from simulation of movement of the capsule through the atmosphere at a simulated altitude and velocity as represented by voltage signals to the computer, the computer comprising three function generators, one of which provides a third power function of the input thereto and another of which provides a fourth power function of the input thereto, potentiometer means, multiplier means, summing means, integrating means and indicating means, all connected in a combination which provides to the indicator means signals which result in the desired temperature indication.

---

This invention relates to space simulators, and more particularly to a special purpose heat simulator computer.

In order to properly simulate space capsule conditions, it is necessary to simulate, among other things, the heating and cooling in the cockpit system of the space capsule. For realistic simulation the temperature effects during space flight, must be simulated by this computer with reasonable accuracy. In order to simulate the temperature conditions in a space capsule, it is necessary to make various assumptions so as to provide the simulation of the temperature in a simple manner. Heat energy is transferred to an operational space vehicle by conduction and radiation from hot gases in a shock layer. For simplicity, it has been assumed that the vehicle is heated uniformly by conduction from the space vehicle nose. It follows that it is only necessary to calculate the nose heating due to convection; the heat loss due to radiation; and account for the heat stored in the vehicle. The other assumption which is made is that the effects of gaseous imperfections, such as disassociation and effects of the shock wave boundary layer interaction may be neglected. Additionally, the Reynold's analog is applicable and the Prandtl number is unity.

Therefore, it is one of the objects of the present invention to provide a device for simulating the skin temperature of a simulated space capsule.

Another object of the present invention is to provide a special purpose computer which simulates the temperature of a space capsule in a simple manner.

A further object of this invention is to provide a temperature computer simulator, which is constructed in a simple manner by making certain assumptions.

Other objects and many of the attendant advantages of this invention will be readily appreciated as the same becomes better understood by reference to the following detailed description when considered in connection with the accompanying drawing which is a functional block diagram of one form of the temperature simulator which includes the invention.

In order to properly understand the present invention it is necessary to explain the derivation of the equations which are mechanized, to form the present invention illustrated in the drawing. In deriving the skin temperature equations, several assumptions have been made. The effects of gaseous disassociation and interaction are considered negligible. The Reynold's analogy is considered applicable, and the Prandtl number is assumed unity. The Reynold's analogy relates to the skin friction and heat transfer coefficients for systems that involve forced convection. The Prandtl number is a relationship among the physical properties of the fluid i.e., (the atmosphere) and is unity for this case. These assumptions are definitely valid for re-entry speed at greater than 10,000 feet per second. This derivation includes the heat supply to the body by convection, the heat stored in the body, and the heat transferred due to radiation. Various symbols utilized in the following derivation will be defined infra.

There are three parts to the heating problem which are represented in the following equations:

$$\rho_b C_b d \frac{dT}{dt} - \frac{dH_a}{dt} + \epsilon\sigma T^4 = 0 \tag{1}$$

where:

$$K_1 = \rho_b C_b d \text{ and } K_2 = \epsilon\sigma, \therefore \frac{dH_a}{dt} = K_1 \frac{dT}{dt} + K_2 T^4 \tag{2}$$

The first term in Equation #1, $\rho_b C_b d(dT/dt)$, describes the stored heat in the body and the temperature, $T$, on the surface. The second term, $dH_a/dt$, gives the convective heat input to the body. The third term, $\epsilon\sigma T^4$, gives the heat taken out of the body by radiation. The convective heat into the body $dH_a/dt$ must equal the expression for convective heat input using the body's velocity, atmosphere density, and coefficient of friction.

Therefore:

$$\frac{dH_a}{dt} = K_a \rho V^3 C'_F = \rho(h) K V^3$$

The heat transfer at the stagnation point is:

$$\frac{dH_s}{dt} = K_s \sqrt{\rho/r} V^3$$

where:

$$C'_F \frac{1}{S} \int_S C_F \left(\frac{\rho_1}{\rho}\right) \left(\frac{V_E}{V}\right) dS$$

where: $S$=surface.

The velocity V, is available from the flight computer. The subscripts $a$, $s$, and $l$, refer to average conditions, stagnation point conditions, and local conditions just outside the boundary layer, respectively. $\rho$ is the undisturbed gas density which depends on altitude and is approximated by the following relationship:

$$\rho = (\rho_0 e^{-\beta h}) \tag{6}$$

The vehicle heating is closely connected to the vehicle deceleration and reentry velocity as it enters the atmosphere. This is expressed by the relationship:

$$\left(\frac{dH_s}{dt}\right)_{\text{max.}} = \left(K_3 \sqrt{\frac{\lambda m \sin \theta_E}{3 e r C_D A}}\right) V_E^3 \tag{7}$$

where: $A$=drag area.

The above equations may be combined and rearranged as shown below.

Form Equation 3:

$$V^3 = \frac{1}{P(h)K} \frac{dH_a}{dt} \tag{8}$$

Substitute Equation 8 into Equation 4:

$$\frac{dH_s}{dt} = K_s \left(\sqrt{\frac{\rho}{r}}\right) \left(\frac{1}{\rho(h)K}\right) \left(\frac{dH_a}{dt}\right) \tag{9}$$

Substitute Equation 7 into Equation 9:

$$K_4 V_E^3 = (K_s \sqrt{\rho/r}) \left(\frac{1}{\rho(h)K}\right) \frac{dH_a}{dt} \tag{10}$$

where $K_4$=average value of:

$$K_3\sqrt{\frac{\lambda m \sin \theta_E}{3erAC_D}}$$

By rearranging Equation 10 we get:

$$\frac{dH_a}{dt} = \frac{\rho(h)}{\sqrt{\rho}} \frac{K_4 K}{K_s} V_E^3$$

where $$\therefore \frac{dH_a}{dt} = K_5 \rho(h) V_E^3 \quad K_5 = \frac{K_4 K}{\sqrt{\rho} K_s} \quad (11)$$

the heating rate in terms of reentry velocity. Therefore:

$$K_5\rho(h)V_E^3 = K_1\frac{dT}{dt} + K_2 T^4 = \frac{dH_a}{dt} \quad (12)$$

*Symbols for skin temperature computer equations*

$\rho_b$=density of boundary layer
$C_b$=heat capacity of the surface material
$d$=effective skin depth
$H$=heat transfer per unit area
$J$=surface area
$K$=radius of curvature of the nose cone surface at the stagnation point
$C_F$=coefficient of friction
$V$=velocity of the space vehicle
$\epsilon$=surface emissivity
$\sigma$=Stefan-Boltzman, constant
$V_E$=reentry velocity
$\theta_E$=flight path angle
$m$=mass
$C_p$=aerodynamic drag
$T$=temperature
$\lambda$=constant in density-altitude relation, ft.$^{-1}$ 1/22,000 ft.
$A$=drag surface area
$S$=surface
$C_D$=drag coefficient
$h$=altitude
$r$=radius of curvature of the nose cone at the stagnation point
$\beta$=angle of sideslip
$\theta_E$=flight path angle
$e$=natural logarithm Referring now specifically to the drawing, information signals, representative of altitude and velocity, which may be obtained from a conventional computer that simulates target information, or an Operational Flight Trainer, referred to as an "O.F.T.," are fed to a first function generator 1, and a second function generator 3 respectively. This function generator is coupled to a potentiometer 5, which is grounded. This function generator 1 and its associated potentiometer 5, provides an output voltage which is equal to $\rho(h)K_5$. This function has been so mechanized as to compute $\rho$ as a function of $(h)$ in accordance with Equation 6, supra. Potentiometer 5 is used to provide the proper constant $K_5$. The second velocity function generator 3, is coupled at its output to a multiplier 7. This multiplier 7 has another input which is fed from one end of the altitude potentiometer means 5. The output of the multiplier 7 is coupled to one input of a conventional summing amplifier 9. The output of this summing amplifier is coupled over line 11 to an integrator 13. The output of the integrator 13 is coupled first, to a function generator 15, which provides an output signal which is the fourth power of the input signal coupled thereto. The output of this function generator 15 is then coupled to the second input of said summing amplifier 9. Additionally, the output from the integrator 13, is coupled to an indicating means 17, which provides an indication proportional to the magnitude of the output signal coupled from the integrator 13.

In operation, altitude and velocity, information signals which correspond to the altitude and velocity of the simulated space capsule are coupled to a first function generator 1, and a second function generator means 3, respectively. The altitude information signals are transformed by the function generator so as to provide an output, which is equal to $\rho(h)K_5$, and which is seen at one end of the potentiometer's arm 5. The velocity input information is coupled to the input of the second function generator 3, which provides at its output, a signal proportional to the cubed power of the input signal. This signal is then coupled to one input of multiplier 7. Additionally, the output from the altitude function generator, is coupled to the other input of said multiplier 7. This provides at the output of the multiplier, an output signal, which is proportional to the product of the two inputs, thereby providing an output signal, which is proportional to $\rho(h)K_5V_E^3$. This output signal is then coupled to the first input 19 of summing amplifier 9. This summing amplifier 9 sums the input existing at its first input 19 with the input existing at the second input 21. The output is then coupled to an integrator 13, which integrates this signal. The resulting integral signal is coupled back to the second input 21 of said summing amplifier 9 through the third function generator 15, which provides an output signal to the second input of the summing amplifier 9, which is proportional to the fourth power of the input signal, thereby providing at its output an implicity derived temperature term, a signal whose magnitude is proportional to $K_2T^4$. Therefore there is provided at the output of the summing amplifier 9, a signal whose magnitude is proportional to $K_1 dT/dt$, which is equal to the sum of the two inputs 19 and 21, to the summing amplifier 9. The output of the integrator 13, is also coupled to an indicating means 17, which gives an indication of the actual skin temperature of the device, as it is fed by a signal whose magnitude is a proportional to $K_1T$.

In place of the function generators described, logarithum amplifiers may be used.

Obviously many modifications and variations of the present invention are possible in the light of the above teachings. It is therefore to be understood that within the scope of the appended claim the invention may be practiced otherwise than as specifically described.

What is claimed is:

1. A heat simulator computer for providing an indication of the skin temperature of a simulated space capsule in response to first electrical signals representative of altitude of the simulated capsule and second electrical signals representative of velocity of the simulated capsule, said computer comprising:

a first function generator connected to receive said first electrical signals as an input and operative to provide output voltage signals corresponding to density of the boundary layer at the altitude represented by said first electrical signals;

a potentiometer connected to receive the output voltage signals from said first function generator, said potentiometer providing at the wiper thereof output voltage signals corresponding to the output signals of said first function generator times a constant;

a second function generator connected to receive said second electrical signals as an input and operative to cube such input to provide output voltage signals proportional to the third power of the velocity of the simulated capsule;

a multiplier connected to receive the output voltage signals of said first function generator as a first input and connected to receive the output voltage signals from said potentiometer as a second input, said multiplier being operative to provide output voltage signals corresponding to the product of said first and second inputs thereto;

summing means connected to receive the output voltage signals of said multiplier as a first input, said summing means being operative to sum the first input thereto with a second input thereto to provide an output signal which is the algebraic sum of said first and second inputs thereto and is proportional to the derivative with respect to time of the temperature of said capsule;

integrator means connected to receive as an input the output signal of said summing means, said integrator means being operative to integrate the input thereto with respect to time to provide an output voltage signal which is proportional to the skin tempertaure of said simulated capsule;

third function generator means connected to receive as an input thereto said output signal from said integrator means and operative to provide an output signal which is proportional to the fourth power of said input thereto;

said summing means being connected to receive as said second input thereto said output of said third function generator means; and voltage responsive indicator means connected to receive as an input thereto said output signal from said integrator means, said indicator means being calibrated to indicate said skin temperature of said simulated capsule.

References Cited

UNITED STATES PATENTS

| | | | |
|---|---|---|---|
| 3,194,948 | 7/1965 | Alexander et al. | 235—150.2 X |
| 3,277,287 | 10/1966 | Spriggs et al. | 235—193 X |
| 3,280,310 | 10/1966 | Montooth | 235—193 X |
| 3,293,641 | 12/1966 | Bennet et al. | |

MALCOLM A. MORRISON, *Primary Examiner.*

J. F. RUGGIERO, *Assistant Examiner.*